United States Patent [19]

Kasai

[11] Patent Number: 4,819,306
[45] Date of Patent: Apr. 11, 1989

[54] SWIVEL JOINT
[75] Inventor: Kazumi Kasai, Namerikawa, Japan
[73] Assignee: Yoshida Kogyo K. K., Tokyo, Japan
[21] Appl. No.: 219,485
[22] Filed: Jul. 15, 1988
[30] Foreign Application Priority Data Jul. 16, 1987 [JP] Japan .............. 62-109226[U]

[51] Int. Cl.[4] ........................................... A44B 13/02
[52] U.S. Cl. ............................................... 24/241 SL
[58] Field of Search .......... 24/237, 238, 239, 241 SL; 403/78, 165, 289, 290

[56] References Cited
U.S. PATENT DOCUMENTS

| 231,751 | 8/1880 | Bailey et al. ............... 403/78 X |
|---|---|---|
| 1,661,168 | 3/1928 | Davis et al. . |
| 1,833,672 | 11/1931 | De Vol . |
| 2,002,789 | 5/1935 | Niedecken . |
| 2,068,098 | 1/1937 | Elmendorf . |
| 2,143,033 | 1/1939 | Sakier . |
| 2,535,422 | 12/1950 | Jones . |
| 2,677,268 | 5/1954 | Hobbs . |
| 3,194,396 | 7/1965 | Mock . |
| 3,229,438 | 1/1966 | Flagan . |
| 3,277,617 | 10/1966 | McBride . |
| 3,281,172 | 10/1966 | Kuehl . |
| 3,314,203 | 4/1967 | Hill et al. . |
| 3,363,390 | 1/1968 | Crane et al. . |
| 3,411,255 | 11/1968 | Casebolt . |
| 3,420,021 | 1/1969 | Anghinetti et al. . |
| 3,452,501 | 7/1969 | Zimmer et al. . |
| 3,455,080 | 7/1969 | Meadows . |
| 3,462,900 | 8/1969 | Morrissey . |
| 3,545,795 | 12/1970 | Hertel . |
| 3,559,356 | 2/1971 | Koral . |
| 3,564,788 | 2/1971 | Moore . |
| 3,626,650 | 12/1971 | Lickliter et al. . |
| 3,667,177 | 6/1972 | Biela . |
| 3,688,459 | 9/1972 | Mattix . |
| 3,740,908 | 6/1973 | Moore . |
| 3,803,789 | 4/1974 | Gibson . |
| 3,866,381 | 2/1975 | Eschbach et al. . |
| 3,939,620 | 2/1976 | Bero . |
| 3,989,397 | 11/1976 | Baker . |
| 3,996,703 | 12/1976 | Daniels . |

| 3,996,705 | 12/1976 | Gutierrez . |
|---|---|---|
| 4,006,569 | 2/1977 | Kain . |
| 4,020,602 | 5/1977 | Daniels . |

(List continued on next page.)

FOREIGN PATENT DOCUMENTS

| 2207899 | 7/1973 | Fed. Rep. of Germany ........ 24/238 |
|---|---|---|
| 60-28294 | 8/1985 | Japan . |
| 225014 | 2/1966 | Sweden . |
| 568852 | 4/1945 | United Kingdom . |
| 937756 | 9/1963 | United Kingdom . |

OTHER PUBLICATIONS

Artesian Catalog Sheets Illustrating "Surrounder", Saver, Versa-Cove, The Tile Wall, Alcove, and Versa-Wall, Bathtub Wall Systems of Artesian Industries, (12 pages-undated).

(List continued on next page.)

Primary Examiner—David A. Scherbel
Assistant Examiner—J. Johnson
Attorney, Agent, or Firm—Hill, Van Santen, Steadman & Simpson

[57] ABSTRACT

A swivel joint includes a central member having a joint barrel having a first insertion hole and a second insertion hole parallel thereto, a slot communicating with the first insertion hole, a pair of first confronting inner surfaces defining the first insertion hole and having a pair of first locking ledges respectively, and a pair of second confronting inner surfaces defining the second insertion hole and having a pair of second locking ledges, the first inner surfaces including respective slanted surfaces slanted progressively inwardly toward each other. A retainer member includes a retainer fitted in the slot and a pair of first resilient legs projecting from the retainer and inserted in the first insertion hole. The first resilient legs having respective first locking fingers engaging the first locking ledges, respectively, and slidable respectively on the slanted surfaces under resiliency of the first resilient legs. A hook member has a hook and a pair of second resilient legs projecting from the hook and inserted in the second insertion hole, the second resilient legs having respective second locking fingers engaging the second locking ledges, respectively.

7 Claims, 7 Drawing Sheets

U.S. PATENT DOCUMENTS

| | | |
|---|---|---|
| 4,067,071 | 1/1978 | Altman et al. . |
| 4,080,710 | 3/1978 | Hess . |
| 4,092,813 | 6/1978 | Eggert . |
| 4,105,814 | 8/1978 | Eggert . |
| 4,109,426 | 8/1978 | Dobija . |
| 4,184,297 | 1/1980 | Casamayor . |
| 4,204,376 | 5/1980 | Calvert . |
| 4,288,552 | 10/1980 | Weaver, Jr. . |
| 4,299,064 | 11/1981 | Daniels . |
| 4,338,753 | 7/1982 | Janke . |
| 4,348,443 | 9/1982 | Hein . |
| 4,399,644 | 8/1983 | Bright . |
| 4,443,508 | 4/1984 | Mehl . |
| 4,472,469 | 9/1984 | Thies . |
| 4,533,278 | 8/1985 | Corsover et al. . |
| 4,555,884 | 12/1985 | van Eerden . |
| 4,569,171 | 2/1986 | Kuhr et al. . |
| 4,578,832 | 4/1986 | Primucci . |
| 4,665,592 | 5/1987 | Kasai .................................. 24/237 X |
| 4,671,026 | 6/1987 | Wissinger . |

OTHER PUBLICATIONS

BathCraft Catalog Sheets Illustrating "Economy Quality Tubwal", (Model BC-5055), Premium Tubwal, (Model BC-58), and Professional Quality Fiberglass Tubwal, (Model BC-5060), (6 pages-undated).

HPI Installation Instructions for "The Decathalon", (Model WS-30) of Housing Productions, Inc., (2 pages-undated).

Lyons Brochure entitled "Lyons-the Best Value in Bath Systems" of Lyons Industries, Inc., (4 pages-undated).

Novi American Catalog Sheets Illustrating "Cameo Tub Kit", Classic Tub Kit, Cameo Deluxe Tub Kit, Premier Tub Kit, Classical Floral Tile Kit, Scenic Surrounds, Tex-Tile Tub Kit, Shower Mate Tub Kit, Supra Tub Kit, Park Lane Tub Kit, Elan Tub Kit, and Jiffy Wall of Novi American Inc., (24 pages-undated).

Plaskolite Catalog entitled "Bath Wraps by Plaskolite-Bath & Shower Wall Kits-Style that Surrounds You.", of Plasoklite, Inc., (12 pages-dated 12/84).

Stylemate Brochure entitled "Stylemate-a Friend of the 'Do-It-Yourself' Plumber" of Stylemate Industries Division of E. L. Muste & Sons, Inc., (6 pages-dated 2/80).

Trayco Brochure entitled "Trayco-New for 1985-Beautiful Baths . . . Made Beautifully Easy!" of Trayco, a Subsidiary of Masco Corporation, (4 pages-dated 1985).

Trayco Brochure entitled "Trayco Do-It-Yourself Bath Systems" of Trayco, a Subsidiary of Masco Corporation, (12 pages-dated 1983).

Universal-Rundle Catalog entitled "UR Tub Wall Surrounds" of Universal-Rundle Corporation, (6 pages-undated).

Universal-Rundle Bath Products Brochure entitled "Unmistakably U/R Wall Surround Bathing Environments" Illustrating the Tahoe, Newport, Manhattan, Morocco, Monterey, Dover Simplex and Acapulco Shower Surround Models, (8 pages-undated).

FIG. 1
FIG. 2
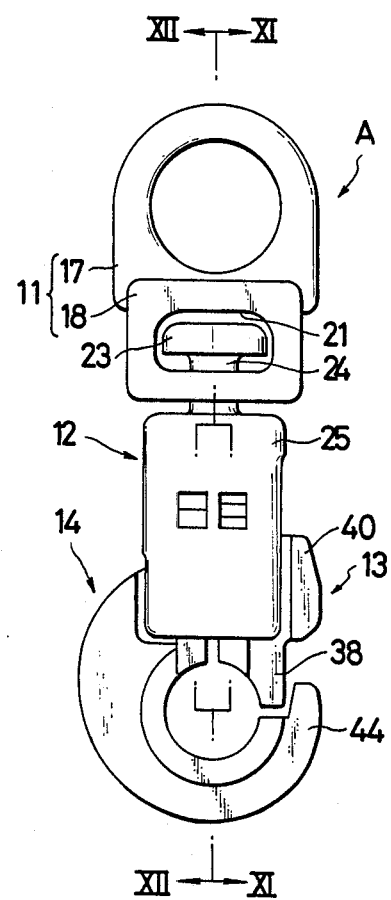
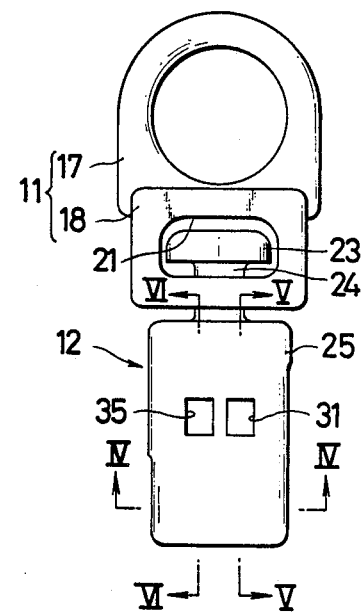

FIG. 14
FIG. 15
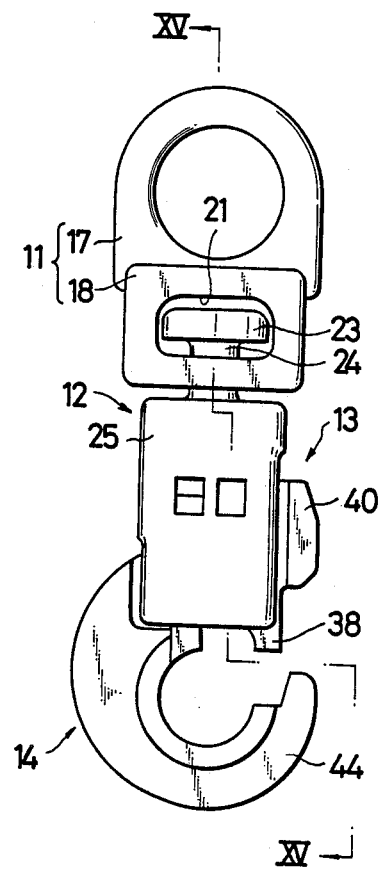
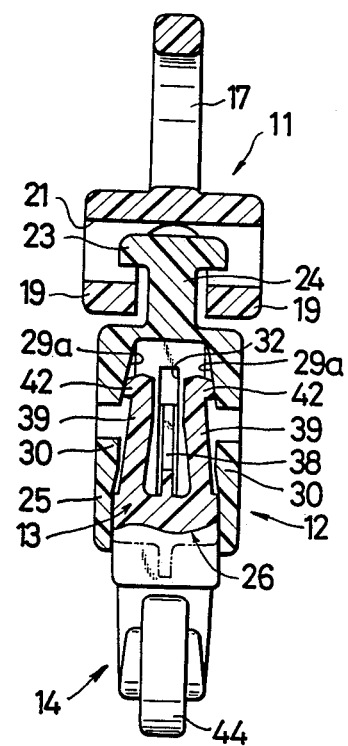

FIG. 18
FIG. 19
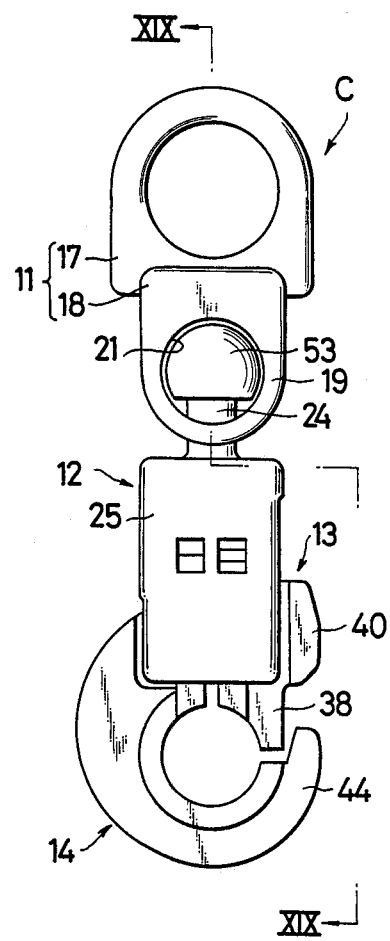
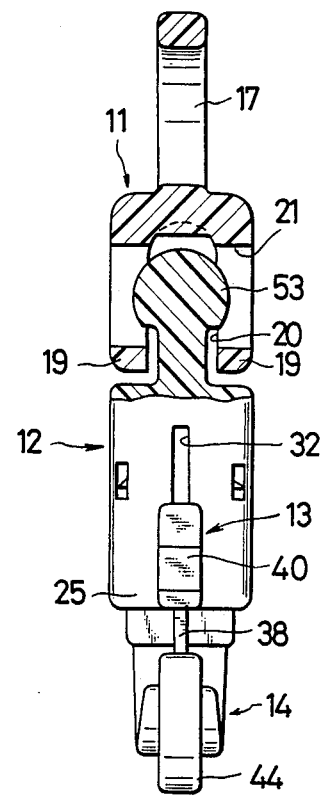

SWIVEL JOINT

BACKGROUND OF THE INVENTION

1. Field of the Invention:

The present invention relates to a swivel joint for use as a key holder or the like.

2. Description of the Prior Art:

Japanese Utility Model Publication No. 60-28294 published Aug. 27, 1985 discloses a swivel joint for use as a key holder or the like. The disclosed swivel joint includes a cylindrical member, a release member and a ring member which are disposed in one end portion of the cylindrical member, and a hook member disposed in an opposite end portion of the cylindrical member. By pushing pressers of the release member into the cylindrical member, locking fingers of the hook member are released from ledges of the cylindrical member to allow the hook member to slide in a direction out of the cylindrical member through its opposite end portion.

When assembling the swivel joint, the release member are inserted into said one end portion of the cylindrical member and the hook member is inserted into the opposite end portion of the cylindrical member. This assembling process is tedious and time-consuming. For attaching a key to or detaching a key from the hook member, it is necessary to release the locking fingers from the ledges with the release member for permitting the hook member to slide with respect to the cylindrical member, attach or detach the key, and push the hook member again into the cylindrical member until the locking fingers engage the ledges. Therefore, the procedure of attaching or detaching a key is also tedious and time-consuming.

SUMMARY OF THE INVENTION

In view of the aforesaid drawbacks of the conventional connector, it is an object of the present invention to provide a swivel joint which can be assembled with ease and allows a key or the like to be attached thereto and detached therefrom through a simple procedure.

According to the present invention, there is provided a swivel joint comprising: a central member having a joint barrel having a first insertion hole and a second insertion hole which are defined therein parallel to each other and opening at one surface of the joint barrel, a slot defined in a side wall of the joint barrel in communication with the first insertion hole, a pair of first confronting inner surfaces defining the first insertion hole therebetween and having a pair of first locking ledges respectively, and a pair of second confronting inner surfaces defining the second insertion hole therebetween and having a pair of second locking ledges, the first inner surfaces including respective slanted surfaces slanted progressively inwardly toward each other toward an inner closed end of the first insertion hole; a retainer member having a retainer fitted in the slot and a pair of first resilient legs projecting from the retainer and inserted in the first insertion hole, the first resilient legs having respective first locking fingers on distal ends thereof engaging the first locking ledges, respectively, and slidable respectively on the slanted surfaces under resiliency of the first resilient legs; and a hook member having a hook and a pair of second resilient legs projecting from the hook and inserted in the second insertion hole, the second resilient legs having respective second locking fingers engaging the second locking ledges, respectively.

When installing the retainer member and the hook member in the joint barrel, the first resilient legs of the retainer member are inserted into the first insertion hole until the first locking fingers engage the first locking ledges, and the second resilient legs of the hook member are inserted into the second insertion hole until the second locking fingers engage the second locking ledges. For attaching a key or the like to or detaching a key or the like from the hook member, the retainer member is slid along the slot to force the first resilient legs to be elastically deformed as they move along the slanted surfaces. When the retainer member is released, the first resilient legs are caused to spring back under their own resiliency to displace the retainer member toward its lower position.

Many other advantages and features of the present invention will become manifest to those versed in the art upon making reference to the detailed description and the accompanying sheets of drawings in which preferred structural embodiments incorporating the principles of the present invention are shown by way of example.

BRIEF DESCRIPTION OF THE DRAWINGS

FIG. 1 is a front elevational view of a swivel joint according to embodiment of the present invention;

FIG. 2 is a front elevational view of a ring member and a central member of the swivel joint shown in FIG. 1;

FIG. 14 is a front elevational view showing the manner in which the retainer member is slid with respect to a joint barrel of the main member;

FIG. 15 is a cross-sectional view taken along line XV—XV of FIG. 14;

FIG. 18 is a front elevational view of a swivel joint according to a third embodiment of the present invention; and FIG. 19 is a cross-sectional view taken along line XIX—XIX of FIG. 18.

DETAILED DESCRIPTION

Figure 3:
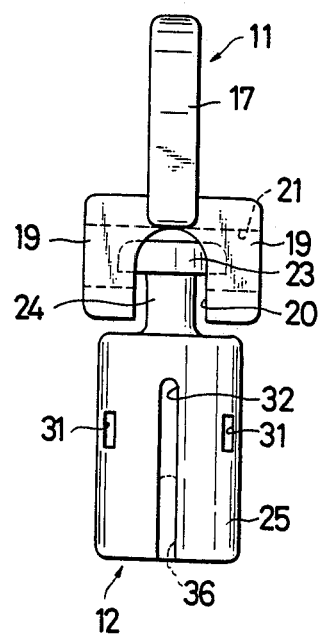
FIG. 3 is a righthand side elevational view of the ring member and the central member of FIG. 1.

Like or corresponding parts are denoted by like or corresponding reference numerals throughout views.

The principles of the present invention are particularly useful when embodied in a swivel joint, generally designated at A, shown in FIG. 1.

As shown in FIG. 1, the swivel joint A comprises a ring member 11, a central member 12, a retainer member 13, and a hook member 14, which are all molded of synthetic resin by injection molding.

Figure 4:
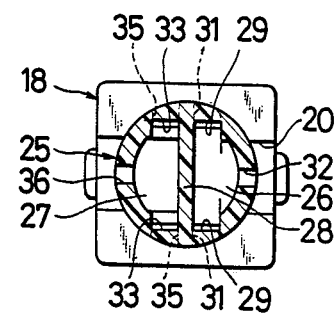
FIG. 4 is a cross-sectional view taken along line IV—IV of FIG. 2.

As illustrated in FIGS. 2 through 4, the ring member 11 is composed of a ring 17 for attachment to a string or a belt, and a holder barrel 18 holding the central member 12. The ring 17 is substantially of an annular shape projecting from an upper central portion of the holder barrel 18. The holder barrel 18 is substantially in the shape of a bifurcated rectangular parallelepiped having a pair of holders 19 spaced transversely of the ring 17 with a recess 20 of an inverted U shape being defined therebetween and opening downwardly. The recess 20 is of a horizontal size greater than the diameter of a shank 24 of the central member 12 and smaller than the diameter of a flange 23 of the shank 24. The holders 19 have respective holes 21 defined centrally therein in a direction transverse of the ring 17 perpendicularly to the recess 20. The holes 21 are of a horizontal size greater than the diameter of the flange 23 of the shank 24 and a vertical size greater than the thickness of the flange 23.

As shown in FIGS. 2 through 6, the central member 12 comprises the shank 24 having the flange 23, and a cylindrical joint barrel 25. The shank 24 projects upwardly from a substantially central portion of the upper surface of the joint barrel 25 into the recess 20 in the ring member 11. The flange 23 is disposed on the upper end of the shank 24 and has a pair of diametrically opposite sides entering the respective holes 21 of the ring member 11. Therefore, the flange 23 of the shank 24 is retained by the holders 19 of the holder barrel 18 so that the central member 12 can swing with respect to the ring member 17 by a certain angle laterally of the ring member 17 in FIG. 2 about the flange 23, and also rotate 360° about the shank 24.

Figure 5:
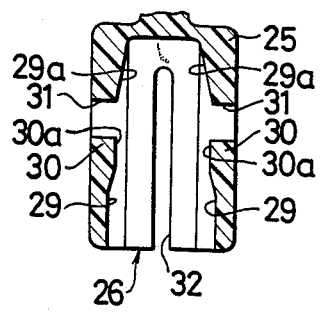
FIG. 5 is a cross-sectional view taken along line V—V of FIG. 2.
Figure 6:
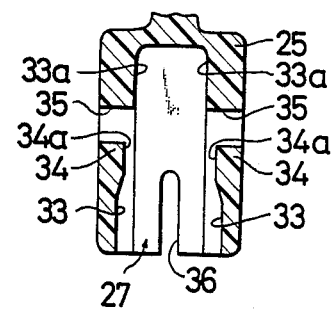
FIG. 6 is a cross-sectional view taken along line VI—VI of FIG. 2.

As shown in FIGS. 4 through 6, the joint barrel 25 has first and second insertion holes 26, 27 defined vertically therein parallel to each other and opening at the lower surface of the joint barrel 25. The insertion holes 26, 27 are of a substantially rectangular shape and extend axially in the joint barrel 25, the insertion holes 26, 27 being of the same depth. The first and second insertion holes 26, 27 are divided by a flat partition wall 28 (FIG. 4) extending diametrically in the joint barrel 25 and upwardly. The first insertion hole 26 is defined between inner confronting side surfaces 29 extending parallel to the partition wall 28 and having a pair of locking steps or ledges 30 (FIG. 5), respectively, substantially centrally thereon. The locking ledges 30 are defined respectively by a pair of window holes 31 defined in a peripheral side wall of the joint barrel 25 which has the inner confronting side surfaces 29. The locking ledges 30 are disposed in confronting relation to each other and project into the first insertion hole 26. The first insertion hole 26 has an inner end portion defined between confronting slanted surfaces 29a inclined progressively inwardly toward each other from upper edges of projecting inner surfaces 30a of the locking ledges 30. The first insertion hole 26 is held in communication with a slot 32 defined in the peripheral side wall of the joint barrel 25 between the window holes 31 for allowing the retainer member 13 to slide in and along the slot 32. The slot 32 extends axially in the joint barrel 25 and has its upper closed end positioned upwardly of the locking ledges 30. The second insertion hole 27 is defined between inner confronting side surfaces 33 extending parallel to the partition wall 28 and having a pair of locking steps or ledges 34 (FIG. 6), respectively, which confront each other and project into the second insertion hole 27. The locking ledges 34 are defined by respectively by a pair of window holes 35 defined in the peripheral side wall of the joint barrel 25 parallel to the window holes 31. The second insertion hole 27 has an inner end portion defined between confronting parallel surfaces 33a positioned inwardly of projecting inner surfaces 34a of the locking ledges 34. The second insertion hole 27 communicates with a slot 36 defined in the peripheral wall of the joint barrel 25 between the window holes 35 for allowing the hook member 14 to be positioned in the slot 36. The slot 36 extends axially in the joint barrel 25 and has its inner closed end located downwardly of the locking ledges 34.

Figure 7:
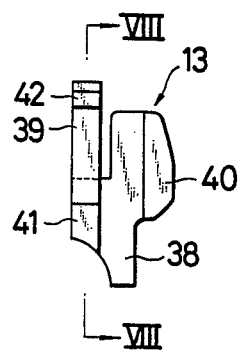
FIG. 7 is a front elevational view of a retainer member of the swivel joint shown in FIG. 1.
Figure 8:
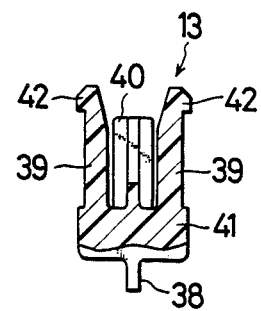
FIG. 8 is a cross-sectional view taken along line VIII—VIII of FIG. 7.

As shown in FIGS. 7 and 8, the retainer member 13 is constructed of a retainer 38, a pair of resilient legs 39, and a pusher 40. The retainer 38 is slightly thinner than the width of the slot 32 and has a length which is substantially the same as the length of the slot 32. The resilient legs 39 project upwardly from a base 31 extending laterally from the retainer 38 remotely from the pusher 40. The base 41 is positioned upwardly of the lower end of the retainer 38. The base 41 and the resilient legs 39 will fit into the first insertion hole 26 in the joint barrel 25. The resilient legs 39 have respective locking fingers 42 on their distal ends which project outwardly away from each other. The locking fingers 42 are situated upwardly of the upper end of the retainer 38 for engaging the locking ledges 30, respectively, in the first insertion hole 26. The vertical thickness of the locking fingers 42 is smaller than the height of the window holes 31. The pusher 40 is thicker than the retainer 38 and positioned in confronting relation to the resilient legs 39.

Figure 9:
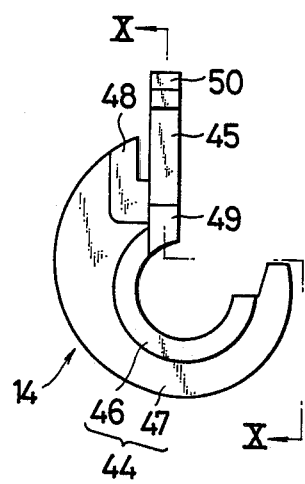
FIG. 9 is a front elevational view of a hook member of the swivel joint illustrated in FIG. 1.
Figure 10:
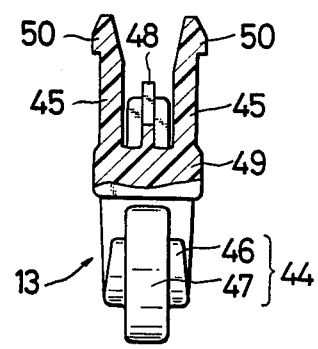
FIG. 10 is a cross-sectional view taken along line X—X of FIG. 9.

As illustrated in FIGS. 9 and 10, the hook member 14 comprises a hook 44 and a pair of resilient legs 45. The hook 44 is substantially of a C shape and includes a wider arcuate web 46 on an inner peripheral side and a narrower arcuate ridge 47 on an outer peripheral side. The ridge 47 is longer than the web 46 and has a distal end extending upwardly beyond the distal end of the web 46. The ridge 47 has a fitting member 48 on an upper end opposite to the distal end thereof. The fitting member 48 is slightly thinner than the width of the slot 36 and has a length which is substantially the same as the length of the slot 36. The resilient legs 45 project upwardly from a base 49 extending laterally from the hook 44. The base 49 is located upwardly of the distal end of the ridge 47 of the hook 44. The base 49 and the resilient legs 45 will fit into the second insertion hole 27 in the joint barrel 25. The resilient legs 45 have respective locking fingers 50 on their distal ends which project outwardly away from each other. The locking fingers 50 are disposed upwardly of the fitting member 48 for engaging the locking ledges 34, respectively, in the second insertion hole 27. The vertical thickness of the locking fingers 50 is substantially the same as the height of the window holes 35.

Figure 11:
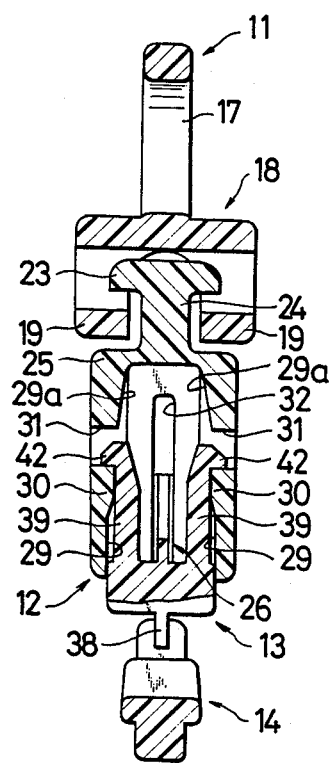
FIG. 11 is a cross-sectional view taken along line XI—XI of FIG. 1.
Figure 12:
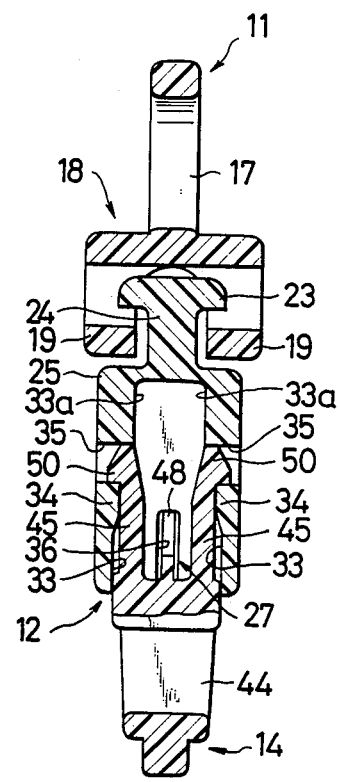
FIG. 12 is a cross-sectional view taken along line XII—XII of FIG. 1.

For installing the retainer member 13 and the hook member 14 in the joint barrel 25 of the central member 12, the resilient legs 39 of the retainer member 13 are inserted into the first insertion hole 26 from below the joint barrel 25, and then the resilient legs 45 of the hook member 14 are inserted into the second insertion hole 27 from below the joint barrel 25. When the retainer member 13 is thus inserted in the first insertion hole 26, the lower end of the retainer 38 projects from the lower surface of the joint barrel 25, and the locking fingers 42 of the resilient legs 39 engage the respective locking ledges 30 in the first insertion hole 26 (see FIG. 11). The retainer 38 is fitted in the slot 32 and has its upper end spaced from the closed end of the slot 32. Therefore, the retainer member 13 as it is installed in position can slide toward the ring member 11 without swinging with respect to the joint barrel 25. When the hook member 14 is inserted in the second insertion hole 27, the distal end of the ridge 47 of the hook 44 is positioned outwardly of the lower end of the retainer 38 of the retainer member 13, and the locking fingers 50 of the resilient legs 45 engage the respective locking ledges 34 in the second insertion hole 27 (see FIG. 12). The fitting member 48 of the hook member 14 is fitted in the slot 36 with the upper end of the fitting member 48 being held against the upper closed end of the slot 36. Consequently, the hook member 14 as it is installed in position does not swing with respect to the joint barrel 25.

Figure 13:
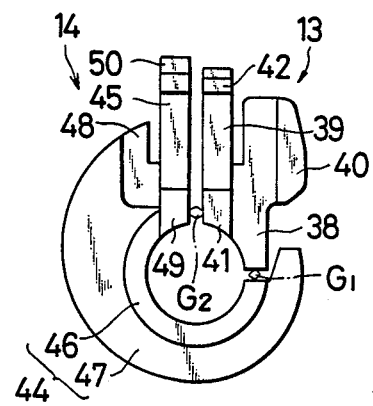
FIG. 13 is a front elevational view of the retainer member and the hook member as they are injection-molded together.

FIG. 13 shows the manner in which the retainer member 13 and the hook member 14 are injection-molded together. As shown in FIG. 13, the retainer member 13 and the hook member 14 are injection-molded together through two gates $G_1$, $G_2$ of an injection molding machine (not shown). For assembly, while the gates thus formed, also indicated at $G_1$, $G_2$, are left as they are, the retainer member 13 and the hook member 14 may be simultaneously inserted into the respective first and second insertion holes 26, 27, and thereafter the gates $G_1$, $G_2$ may be removed. This assembling process allows the retainer member 13 and the hook member 14 to be assembled more easily on the central member 12.

A key or the like can be attached to or detached from the hook member 14 of the swivel joint A as follows: The retainer member 13 is pushed upwardly toward the ring member 11 by pressing a finger against the lower end of the pusher 40, as shown in FIG. 14, so that the resilient legs 39 are elastically deformed inwardly toward each other as they slide up the slanted surfaces 29a of the first insertion hole 26 (see FIG. 15). While keeping the retainer member 13 in the raised position, a key is attached to or detached from the hook 44 through its distal end, and then the pusher 40 of the retainer member 13 is released of the finger push. The resilient legs 39 are then forced under their own resiliency to spread outwardly away from each other as they slide down the slanted surfaces 29a, until the retainer member 13 is displaced downwardly away from the ring member 11 into the position shown in FIG. 11. Accordingly, a key can be attached to and detached from the hook member 14 simply by sliding the retainer member 13 toward the ring member 11 and releasing the retainer member 13.

Figure 16:
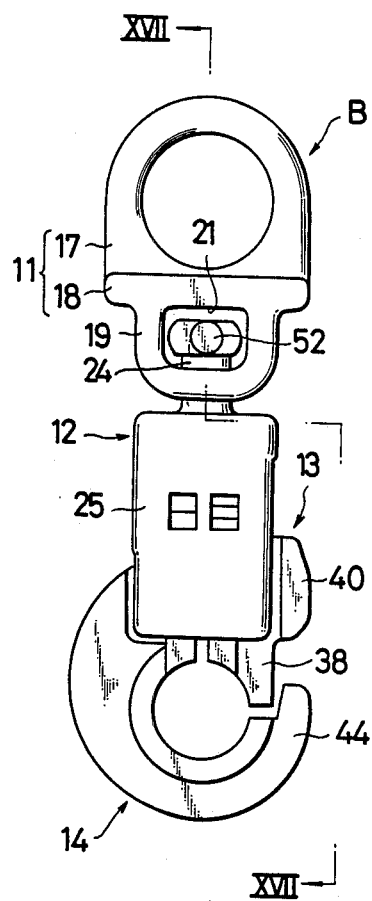
FIG. 16 is a front elevational view of a swivel joint according to a second embodiment of the present invention.
Figure 17:
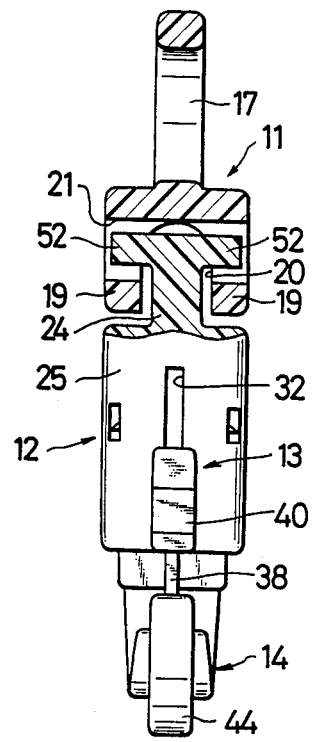
FIG. 17 is a cross-sectional view taken along line XVII—XVII of FIG. 16.

FIGS. 16 and 17 show a swivel joint B according to a second embodiment of the present invention. The swivel joint B differs structurally from the swivel joint A in that the flange 23 of the swivel joint A is replaced with a pair of rods 52 projecting laterally away from each other into the respective holes 21. The central member 12 of the swivel joint B is allowed to swing about 180° laterally in FIG. 16 with respect to the ring member 11.

A swivel joint C according to a third embodiment of the present invention shown in FIGS. 18 and 19 differs structurally from the swivel joint A of the first embodiment in that the flange 23 of the swivel joint A is replaced with a spherical member 53. The central member 12 of the swivel joint C is allowed to swing about 180° laterally in FIG. 18 and also to rotate 360° about the shank 24.

With the arrangement of the present invention, since the first and second insertion holes 26, 27 are defined parallel to each other in the joint barrel 25 and open at the lower end of the joint barrel 25, the retainer member 13 and the hook member 14 can be inserted into the respective insertion holes 26, 27 from the lower end of the joint barrel 25. Therefore, the retainer member 13 and the hook member 14 can easily be assembled into the joint barrel 25 through a simpler process than the conventional process. Moreover, the inner end portion of the first insertion hole 26 in which the retainer member 13 is inserted is defined between the slanted surfaces 29a. The slanted surfaces 29a allow the resilient legs 39 of the retainer member 13 which has been pushed into the joint barrel 25 by the pusher 40 can slide back under their own resiliency to displace the retainer member 13 back to its lower position. Accordingly, a key or the like can be attached to and detached from the hook member 14 more easily than with the conventional swivel joint.

Obviously, various modifications and variations of the present invention are possible in the light of the above teaching. It is therefore to be understood that within the scope of the appended claims the invention may be practiced otherwise than as specifically described.

What is claimed is:

1. A swivel joint comprising:

a central member having a joint barrel having a first insertion hole and a second insertion hole which are defined therein parallel, to each other at one surface of said joint barrel, a slot defined in a side wall of the joint barrel in communication with said first insertion hole, a pair of first confronting inner surfaces defining said first insertion hole therebetween and having a pair of first locking ledges respectively, and a pair of second confronting inner surfaces defining said second insertion hole therebetween and having a pair of second locking ledges, said first inner surfaces including respective slanted surfaces slanted progressively inwardly toward each other toward an inner closed end of said first insertion hole;

a retainer member having a retainer fitted in said slot and a pair of first resilient legs projecting from said retainer and inserted in said first insertion hole, said first resilient legs having respective first locking fingers on distal ends thereof engaging said first locking ledges, respectively, and slidable respectively on said slanted surfaces under resiliency of said first resilient legs; and a hook member having a hook and a pair of second resilient legs projecting from said hook and inserted in said second insertion hole, said second resilient legs having respective second locking fingers engaging said second locking ledges, respectively.

2. A swivel joint according to claim 1, said joint barrel having a pair of first window holes defined in a peripheral side wall thereof and confronting each other, said first locking fingers being disposed respectively in said first window holes.

3. A swivel joint according to claim 1, said joint barrel having a pair of second window holes defined in a peripheral side wall thereof and confronting each other, said second locking fingers being disposed respectively in said second window holes.

4. A swivel joint according to claim 1, said slot being longer than said retainer.

5. A swivel join according to claim 1, further comprising a ring member, said central member including a shank having a flange movably retained in said ring member.

6. A swivel joint according to claim 1, further comprising a ring member, said central member including a shank having a pair of rods movably retained in said ring member.

7. A swivel joint according to claim 1, further comprising a ring member, said central member including a shank having a spherical member movably retained in said ring member.

* * * * *